United States Patent [19]

Reibl

[11] Patent Number: 5,790,907
[45] Date of Patent: Aug. 4, 1998

[54] COMPACT PHOTOGRAPHIC CAMERA HAVING LENS SLIDE

[75] Inventor: Michael Reibl, Stuttgart, Germany

[73] Assignee: Eastman Kodak Company, Rochester, N.Y.

[21] Appl. No.: 856,833

[22] Filed: May 15, 1997

[30] Foreign Application Priority Data

Jun. 10, 1996 [DE] Germany ............... 196 23 066.7
Jun. 10, 1996 [DE] Germany ............... 196 23 067.5

[51] Int. Cl.$^6$ .................................................. G03B 17/04
[52] U.S. Cl. ................ 396/348; 396/535; 396/395; 396/416
[58] Field of Search ................ 396/335, 348, 396/395, 414, 416, 511, 512, 517, 535, 536, 538, 541

[56] References Cited

U.S. PATENT DOCUMENTS 4,340,288  7/1982  Stemme et al.
4,812,864  3/1989  Baker .................. 396/348 X

FOREIGN PATENT DOCUMENTS 30 19 307 A 1  5/1980  Germany.

*Primary Examiner*—Howard B. Blankenship
*Attorney, Agent, or Firm*—Robert Luke Walker

[57] ABSTRACT

A photographic camera of small, flat design, comprising a body shell, a taking lens, a viewfinder, a film chamber, a film transport apparatus, and a flash device. The body shell is configured parallelepipedally and has on its front side a linear flat guideway in which a lens slide is guided displaceably from a non-operating position into a taking position and for purposes of film transport. For this purpose the body shell is equipped on the back side with a linear flat guideway, and the film chamber is configured as a replaceable film cassette that is displaceably guided in the flat guideway. The film cassette serves to receive a film strip equipped with an edge perforation, and consists of a flat, parallelepipedal housing with an exposure window and a film mouth. There extends in the housing, in the longitudinal direction thereof, a circumferential and continuous film channel which passes by the exposure window and opens into the film mouth.

20 Claims, 9 Drawing Sheets

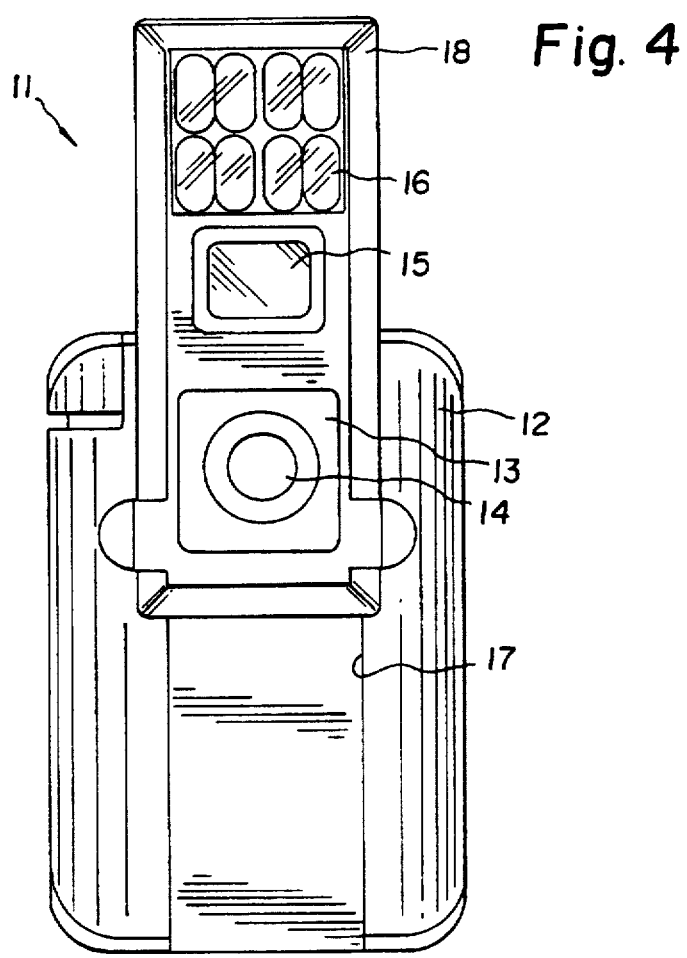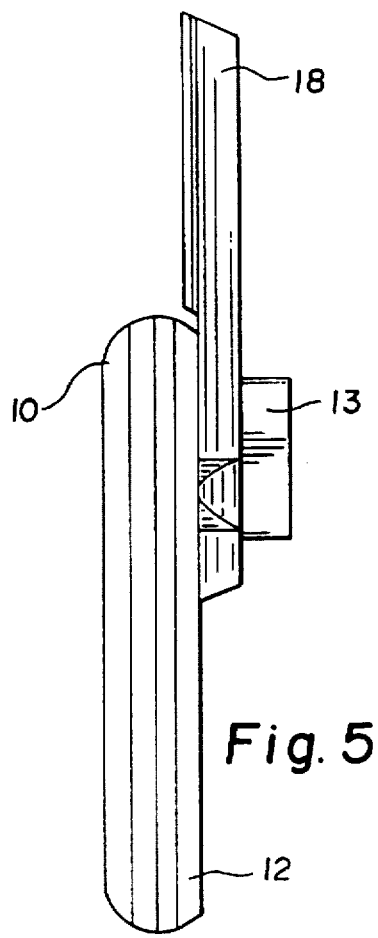

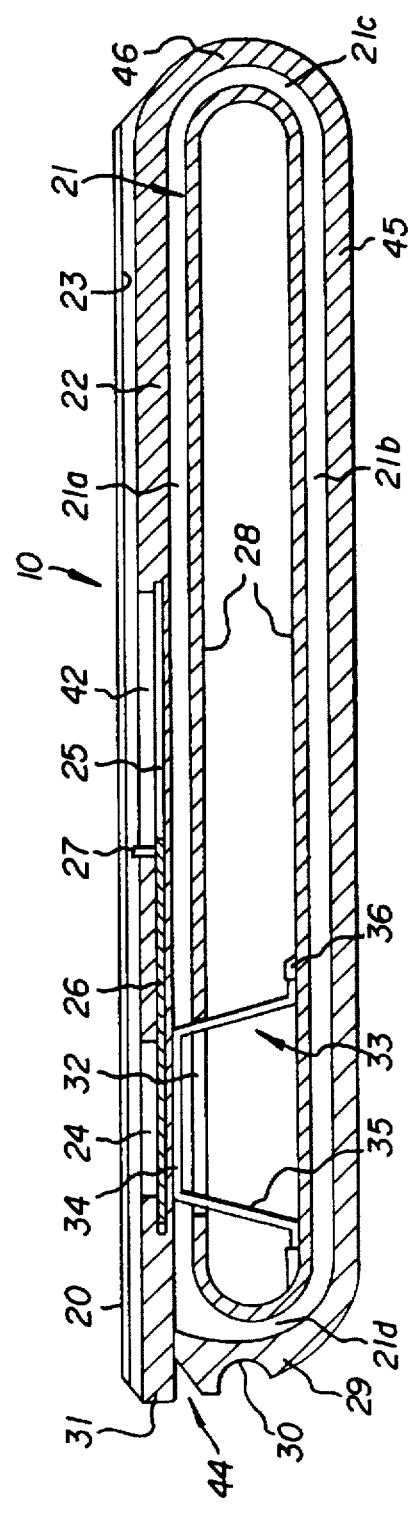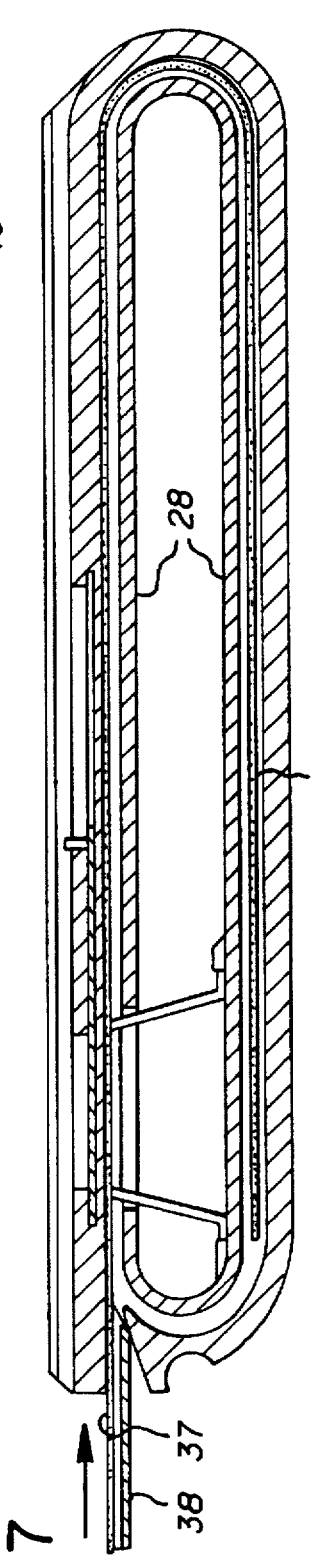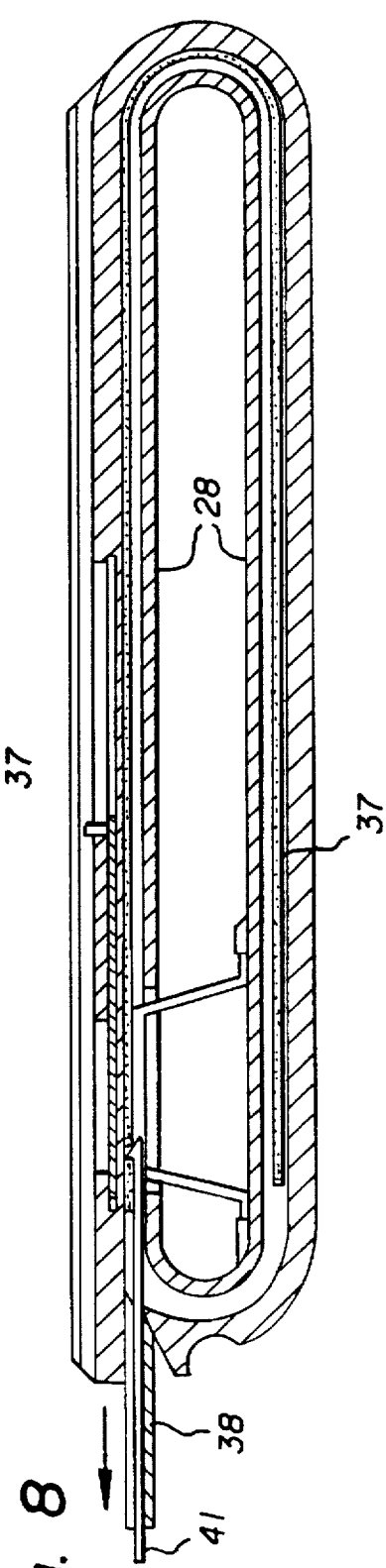

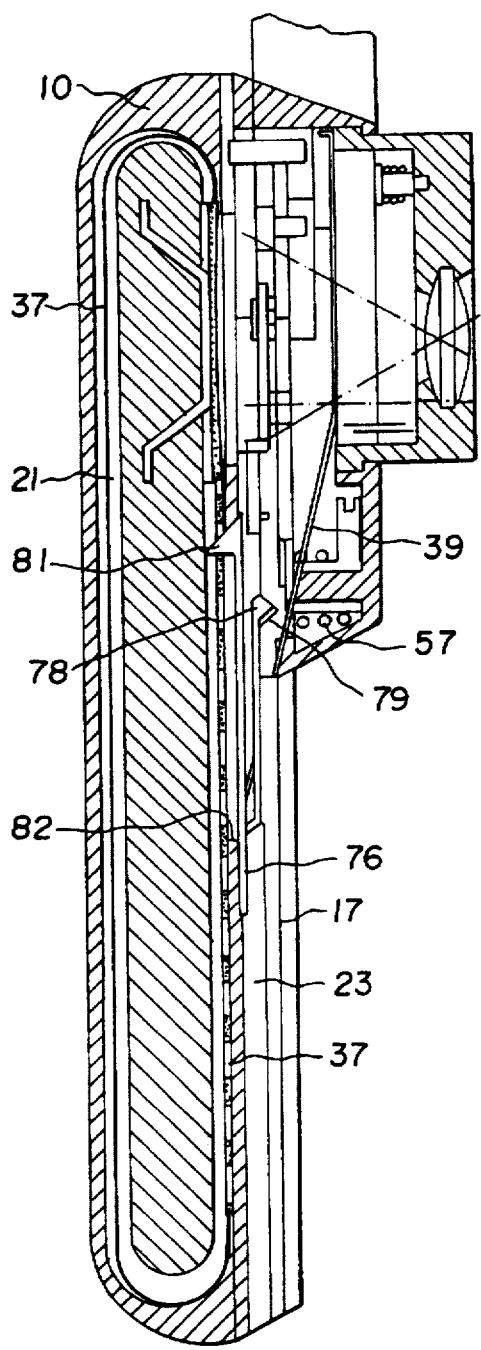
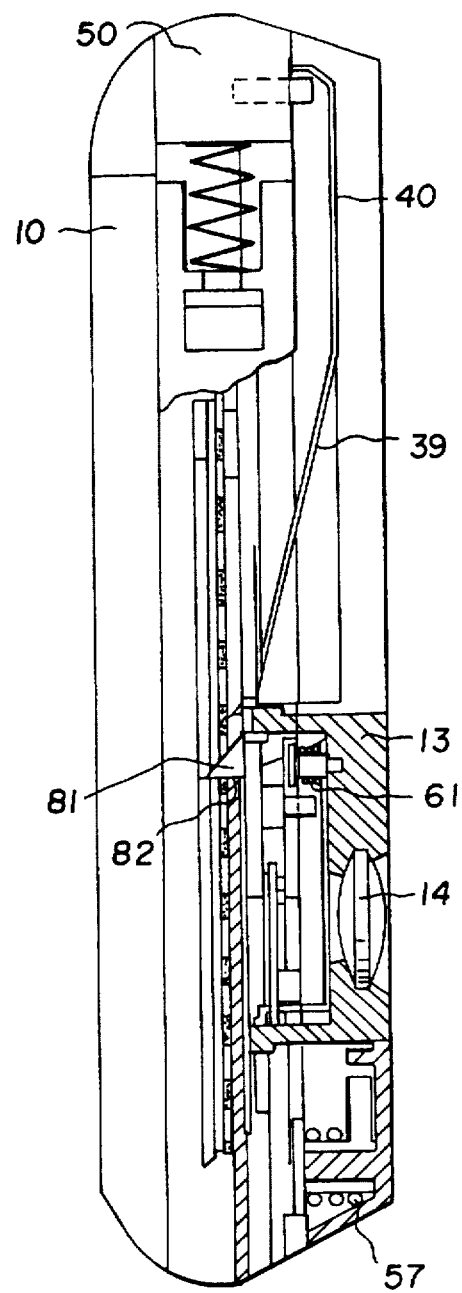
FIG. 13
FIG. 14

COMPACT PHOTOGRAPHIC CAMERA HAVING LENS SLIDE

FIELD OF THE INVENTION

The invention relates to photographic cameras. More particularly, the invention relates to small, photographic cameras including a body shell, a taking lens, a viewfinder, a film chamber, a film transport apparatus, and flash device.

BACKGROUND OF THE INVENTION

In the field of photographic cameras there is a clear trend toward the construction of small, high-performance cameras. In known cameras of this kind, the film to be exposed is accommodated as film strips lying flat in flat cassettes. The small number of frames that can be accommodated on the film strips is a disadvantage. This disadvantage can be mitigated with the use of the "half-frame" format, i.e. a dimension of 24×18 mm per frame for a 135 film format, but this format still remains unsatisfactory.

A camera of this kind is known from German published application 30 19 307. This document discloses a photographic camera with a lens, an image stage, and a rear cover, and uses a flat, pocket-like film cassette which contains a light-sensitive film strip, suitable for taking a plurality of pictures, that can be moved out of and into the cassette through a film mouth provided on one narrow side of the cassette. A cassette space is provided between the camera rear cover and a cassette support configured on a camera body shell. A film receiving space is arranged parallel to this structure, between the surface of the camera body shell parallel to the cassette support and a wall of the camera housing lying opposite to the camera rear cover and comprising the lens and image stage. The film transport apparatus is mounted on the camera body in the region of extension of the cassette supports and comprises a perforation gear with two rows of teeth.

More specifically with respect to the film cassettes of the pocket-like configuration, known film cassettes of this design are configured so that they can receive a film strip only as a linear film section. A film cassette of this kind is described in DE-OS 2 901 104. The natural result is that only a few picture areas can be accommodated on the film section, since the length of the film cassette cannot be of any dimension. Since in the camera design, there is presently a trend toward very small, pocket-size cameras, which nevertheless are intended to supply a sufficient number of pictures per film, the known cassettes are not necessary satisfactory. Also now in demand are cameras that, after complete exposure of a film strip, are unloaded by the finisher in order to develop the film strip and then reloaded by the camera manufacturer with an unexposed film strip in order to resell the camera. Camera concepts of this kind require new configurations for film cassettes and cameras.

SUMMARY OF THE INVENTION

It is a feature of the invention to create a camera of a type that is of simple design and easy to operate, operates reliably, and despite its small dimensions accepts a film strip of sufficient length for a larger number of frames.

According to the invention, a body shell of a camera is configured parallelepipedally; has a front side on which a linear flat guideway is located, in which guideway a lens slide is guided displaceably from a non-operating position to a taking position, and has a back side in which a film chamber is located.

In a preferred embodiment, the body shell also has a linear flat guideway on the back side, and the film chamber is configured as a replaceable cassette that is displaceably guided in the flat guideway.

In a further aspect, the lens slide, which is displaceable from the non-operating operation position into the taking position, is snap-locked into the latter, and in this taking position, the viewfinder is uncovered and the lens is also in its taking position.

In still a further aspect, a lens carrier receiving the lens is guided in the lens slide perpendicular to the movement direction of the lens slide, and is movable from a non-operating position into a taking position and vice versa.

In a particularly advantageous embodiment, the camera is usable with a film cassette to receive a film strip equipped with an edge perforation. The cassette comprises a flat, parallelepipedal housing with an exposure window and a film mouth, and is characterized in that configured in the housing is a circumferential, continuous film channel extending in the longitudinal direction thereof, which passes by the exposure window and opens into the film mouth.

In a further aspect, the film channel comprises two straight sections extending parallel to one another having ends connected by semicircular sections.

In still a further aspect, since the film cassette is configured in this manner, the film cassette has a very flat design and can therefore receive a film strip of considerable length on which eight to twelve frames are accommodated in half-frame format, i.e., 18×24 mm.

In a still more specific aspect, the film cassette is advantageously shaped in such a way that the film channel is constituted by the outer walls and semicircular wall sections of the housing, and a web configured in the housing.

Surprisingly, in the aforedescribed film cassette, a film strip can easily follow the contour of the channel in the semicircular sections of the film channel without being blocked or damaged in its movement within the film channel, despite the relatively small radius of the web ends. This applies in particular to the Advanced Photo System (APS) films just coming onto the market.

In a further aspect, the film mouth is arranged in a region in which a semicircular wall section meets an outer wall of the film cassette.

In still a further aspect, the one semicircular wall section remains joined to the one outer wall, but is arranged separately from the opposite outer wall, this elastic tongue-like wall section resting with its free end against the outer wall under resilient preload, and forming the film mouth.

In still a further aspect, the elastic tongue-like configuration of the semicircular wall section creates a simple and reliable capability of automatically inserting the film strip into the film cassette, and pulling it back out by means of a gripper after exposure.

In still a further aspect, for previous purpose, the U-shaped transfer shoe that is flat in cross-section is provided, such that it can be inserted and pulled out between the outer wall and the elastic tongue-like semicircular wall section.

BRIEF DESCRIPTION OF THE DRAWINGS

Further features and advantages are evident from the description of an exemplified embodiment of the invention and from the further subclaims. In the drawings:

3

Figure 1:
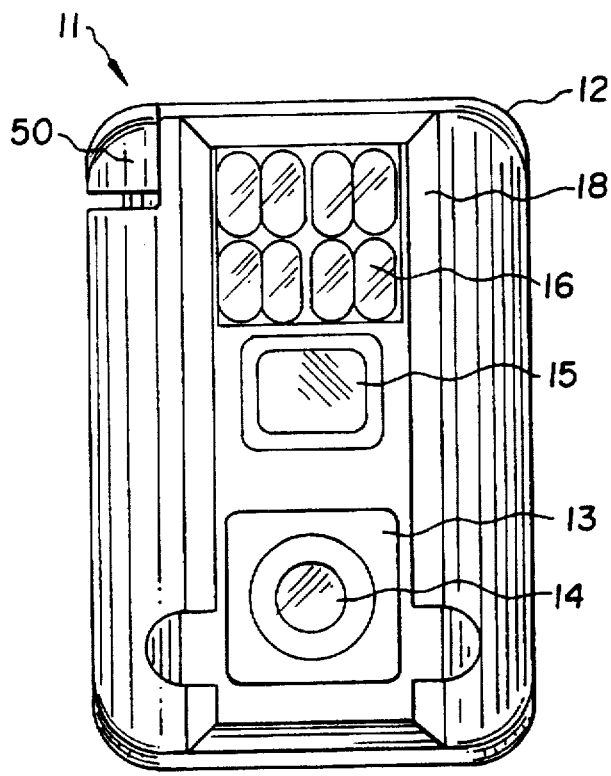
FIG. 1 shows the camera according to the invention, not ready to operate, in a front view.
Figure 2:
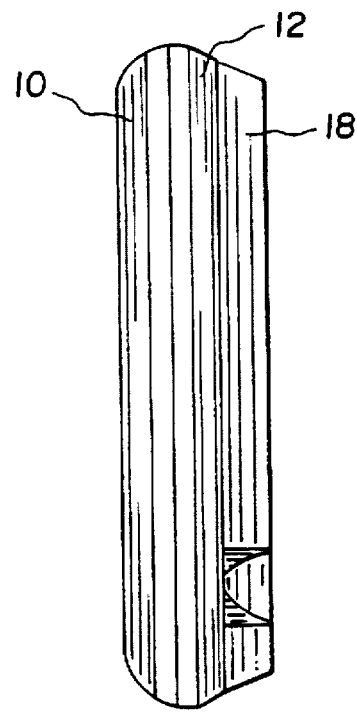
Figure 3:
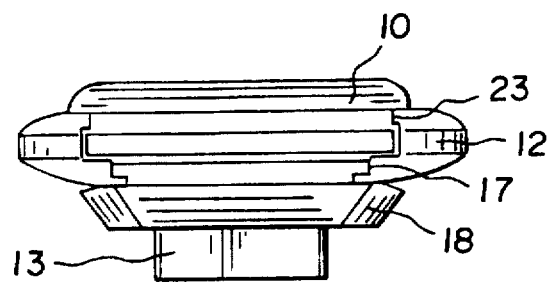
Figure 9:
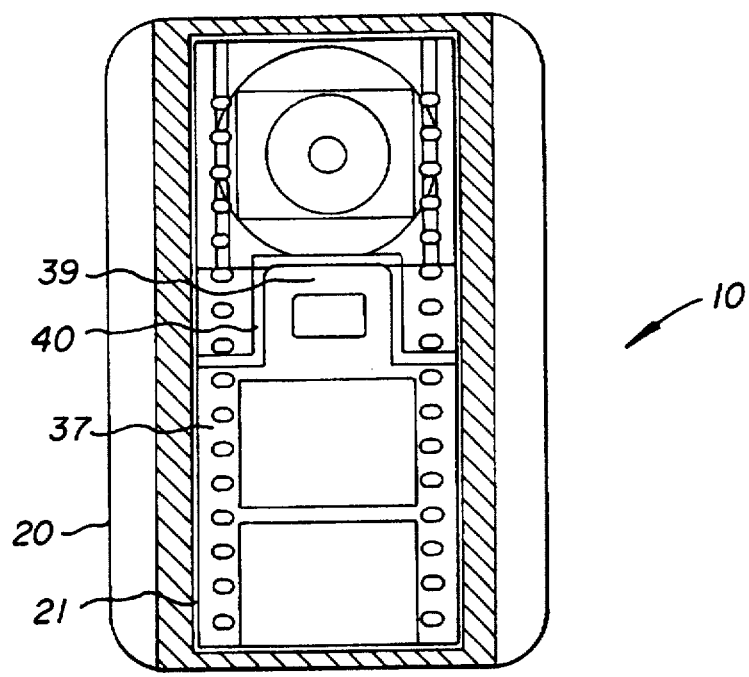
Figure 10:
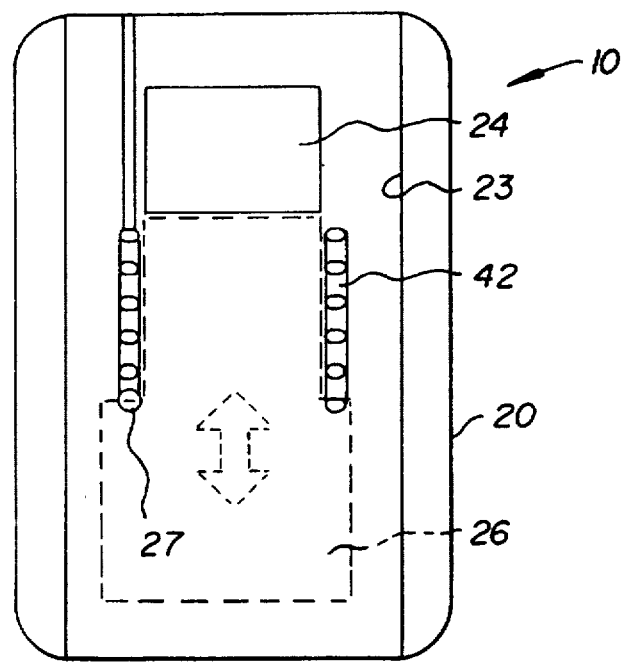
Figure 11:
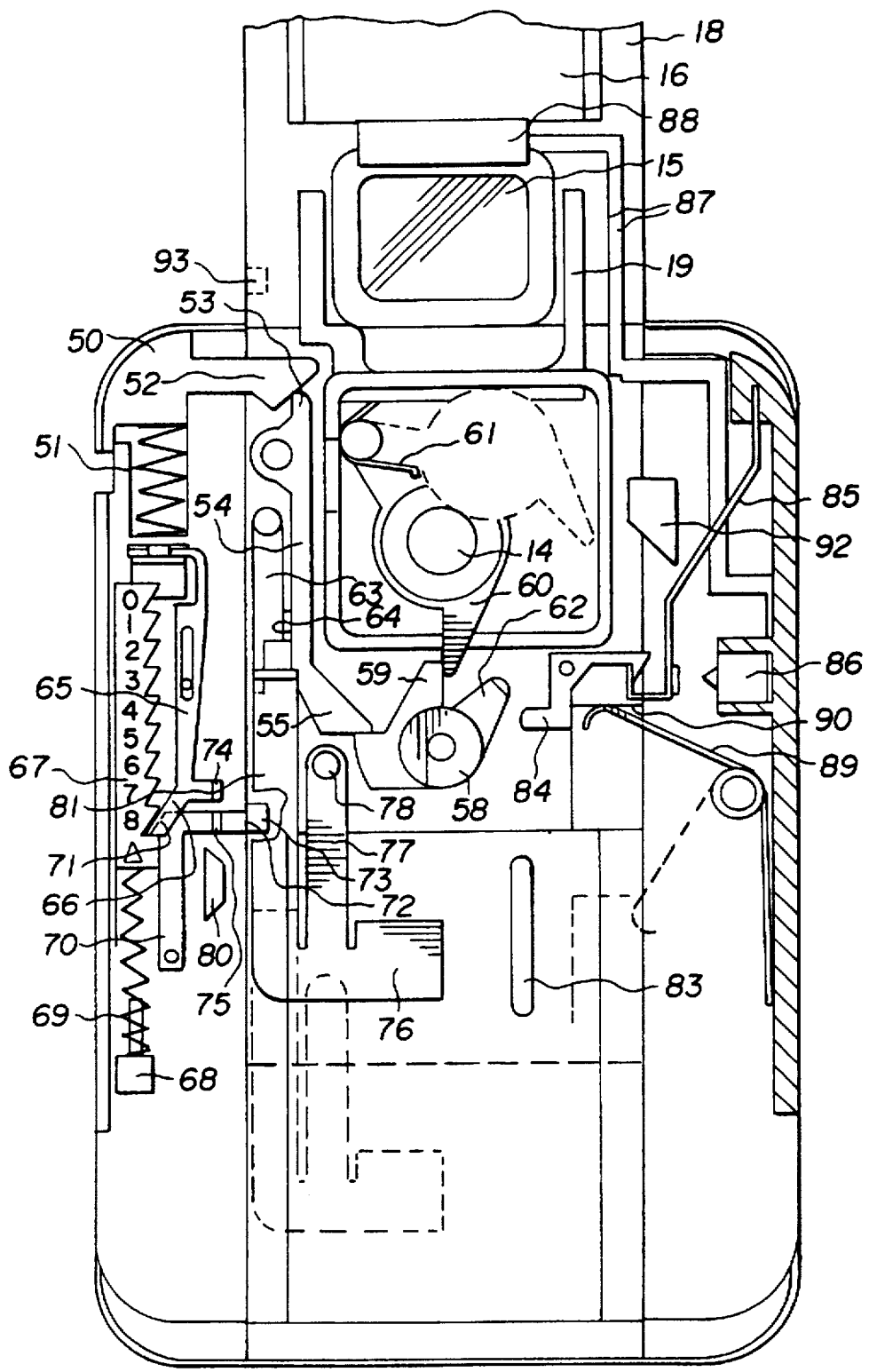
Figure 12:
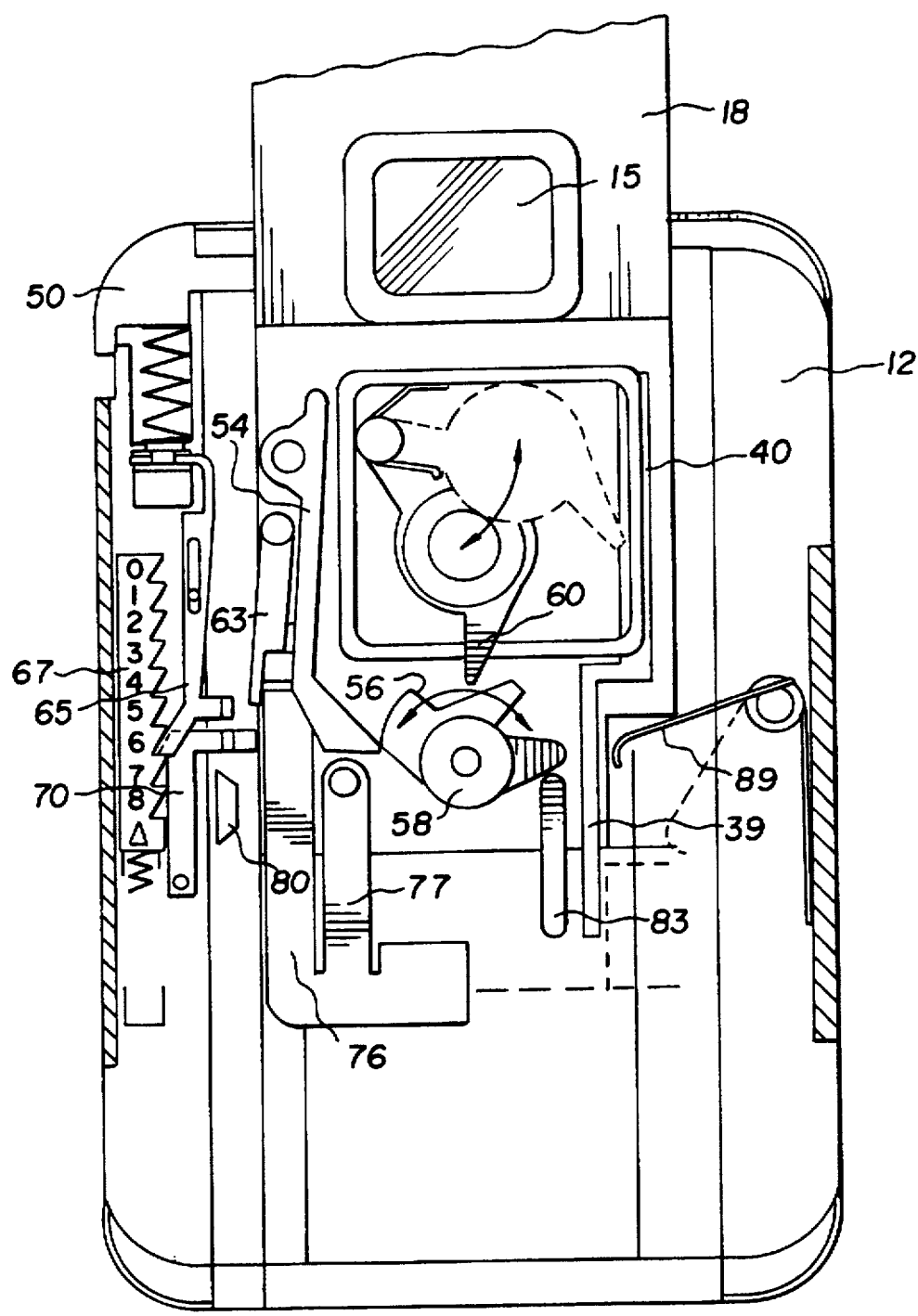
Figure 15:
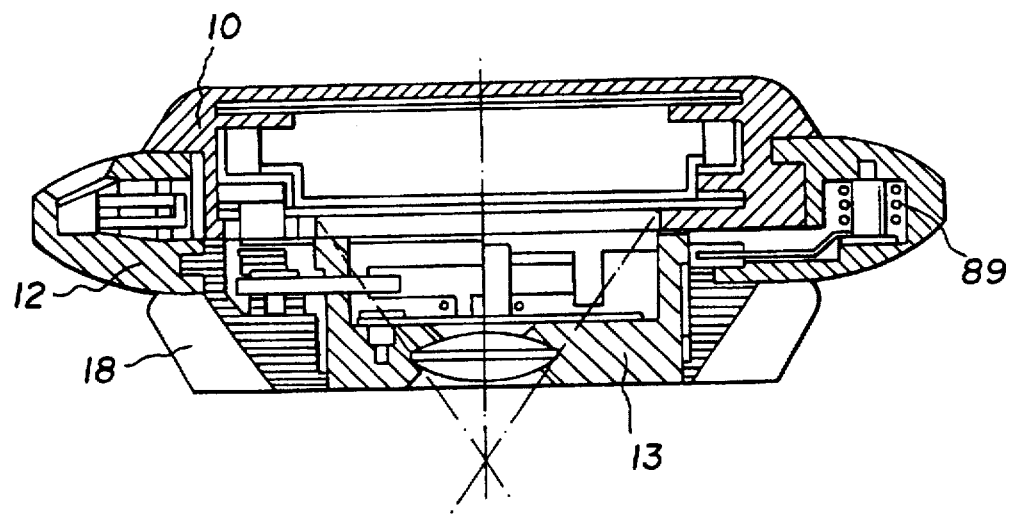
Figure 16:
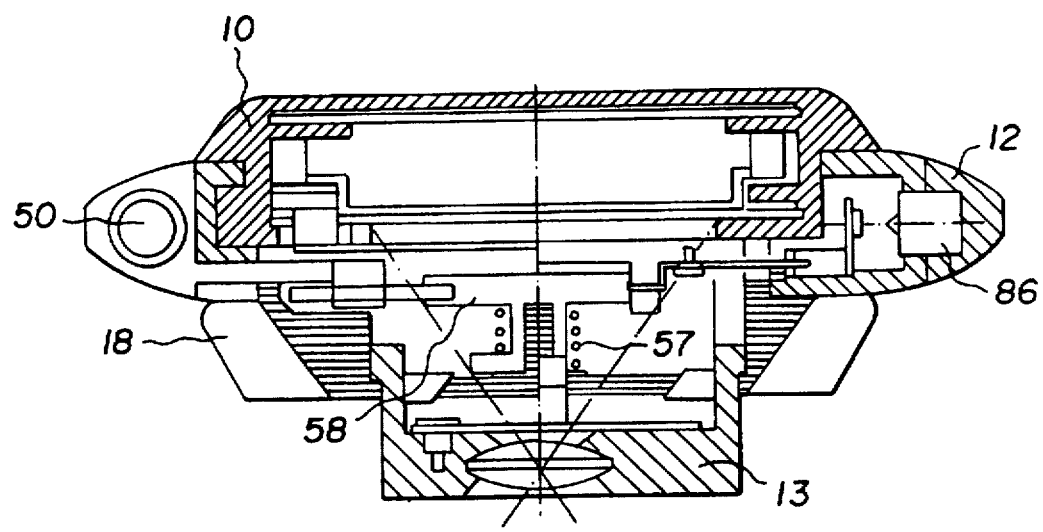
Figure 17:
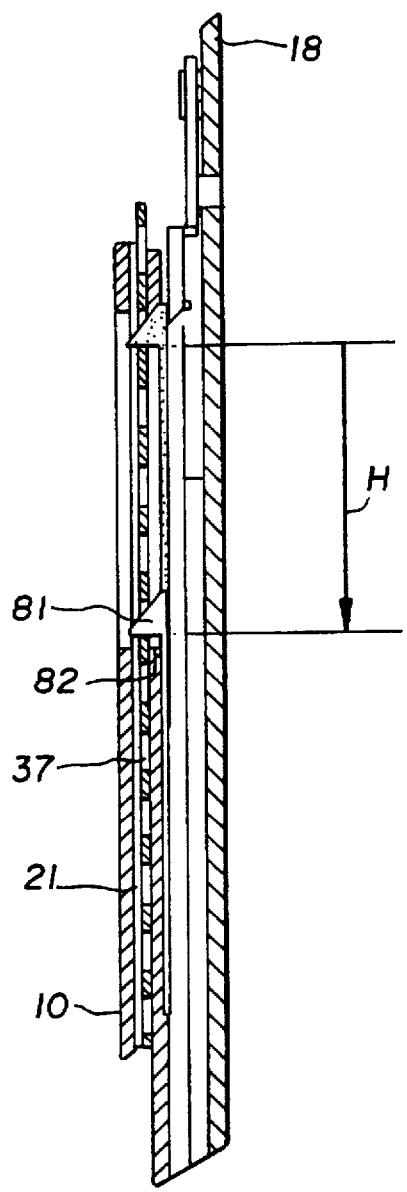
Figure 18:
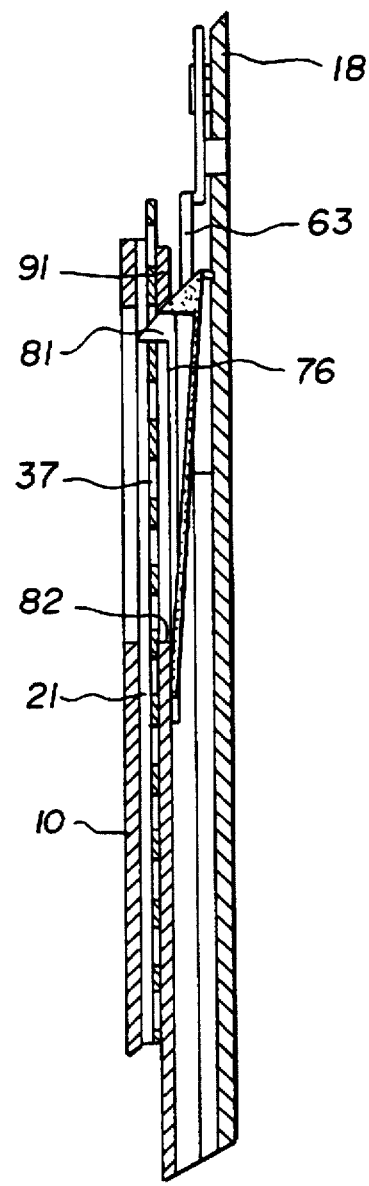

FIG. 2 shows the camera according to FIG. 1 in a side view;

FIG. 3 shows the camera according to FIG. 1 in an end view;

FIG. 4 shows the camera according to FIG. 1, ready to operate, in a front view;

FIG. 5 shows the camera according to FIG. 4 in a side view;

FIG. 6 shows in section a film cassette according to the invention for the camera according to FIG. 1;

FIG. 7 shows in section the film cassette according to FIG. 6 with the film strip in place;

FIG. 8 shows the film cassette according to FIG. 6 with the exposed film strip ready to be pulled out, in longitudinal section;

FIG. 9 shows the film cassette according to FIG. 6 with the film strip in place, in a front view partially in section; and FIG. 10 shows the film cassette according to FIG. 9 in a front view;

FIG. 11 shows the camera according to FIG. 4 with the front wall removed, in an enlarged depiction in a front view;

FIG. 12 shows the camera according to FIG. 4 with the front wall removed, after an exposure operation, in an enlarged depiction in a front view;

FIG. 13 shows the camera according to FIG. 4 in an enlarged depiction in a side view in section;

FIG. 14 shows the camera according to FIG. 1 in an enlarged depiction in partial section;

FIG. 15 shows the camera according to FIG. 14 in a plan view in section;

FIG. 16 shows the camera according to FIG. 13 in a plan view in section;

FIG. 17 shows a detail of the camera according to FIG. 1 in an enlarged depiction in section; and FIG. 18 shows a detail of the camera according to FIG. 1 in an enlarged depiction in section.

DETAILED DESCRIPTION THE CAMERA STRUCTURE-FIGS. 1–6 AND 11–18

Subminiature camera 11 illustrated in the drawings consists of a flat body shell 12 on whose front side a lens slide 18 with a lens carrier 13 is slidable in a flat guideway 17 from a non-operating position into a taking position. A lens 14 is set into lens carrier 13. A viewfinder 15 and a flash arrangement 16 are provided in lens slide 18. Lens carrier 13 is pretensioned in lens slide 18, by means of a return spring 19, against a housing-side ramp 39 and a support surface 40.

On the back side of subminiature camera 11, film cassette 10 is guided, again by means of a flat guideway 23, in body shell 12 so as to slide in and out, and is held in its end positions. The configuration of film cassette 10 will be described in further detail following the description of the construction of the camera.

On the right side of camera 11, a release button 50 is guided longitudinally displaceably parallel to lens slide 18 against the force of a return spring 51. Release button 50 engages with a projection 52 on one arm 53 of a two-armed release pawl 54 mounted pivotedly in lens slide 18, when lens slide 18 is in its taking position. The other arm 55 of release pawl 54 is braced against a surface 56 of an impact lever 58 that is preloaded by a drive spring 57. Impact lever 58 rests with an impact arm 59 against a shutter blade 60 that is held, under the preload of a torsion spring 61, in its closed

4 position in front of lens 14. The impact lever has a cam 62 whose purpose will be described later.

A retaining lever 63, which is braced elastically on arm 55 by means of a lobe 64, is mounted pivotedly in lens slide 18 parallel to arm 55 of release pawl 54.

Also mounted on release button 50 is a counter lever 65, which is guided displaceably in body shell 12 in a pin-and-oblong-hole guide and engages in spring-loaded fashion, with a pawl 66 configured at its free end, into the teeth of a counter bar 67. In the exemplified embodiment, counter bar 67 is designed with eight teeth for eight photographic images, and equipped accordingly with the digits 8 to 1 to count the remaining pictures. A stop 68 delimits movement after the eighth picture is taken, and a compression spring returns counter bar 67 to its zero position. A hook 74, provided on counter lever 65 and interacting with a gate 80 on film cassette 10, serves to disengage the latter from the teeth of counter bar 67 when film cassette 10 is changed.

In addition, a detent pawl 70, which on the one hand engages with a pawl-shaped lug 71 into the teeth of counter bar 67 and on the other hand lies with an end surface 72 at a short distance opposite the side surface of lens slide 18, is mounted pivotedly in body shell 12. With lens slide 18 in either the non-operating or the taking position, there is thus located opposite end surface 72 a cutout 93 or 73 present in the side surface thereof, into which end surface 72 penetrates when film cassette 10 is changed. For this purpose, a hook 75 which cooperates with gate 80 on film cassette 10 is also provided on detent pawl 70.

Furthermore a film gripper 76, which engages by means of a spring arm 77 and a snap ball 78 arranged at its free end into a snap recess 79 configured on lens slide 18, is guided so as to be displaced longitudinally with lens slide 18 in body shell 12. This engagement persists so long as lens slide 18 is moved only for the purpose of film transport after a picture has been taken. Only when lens slide 18 is slid back into its non-operating position does this snap connection 78/79 release and film gripper 76 remain in a position in which film gripper 76 comes into contact with its gripper tooth 81 against a stop shoulder 82 configured in film cassette 10.

A stop 83 that, for purposes of shutter cocking, interacts with cam 62 of impact lever 58, is provided in body shell 12. This cam 62 additionally actuates flash arrangement 16 when the camera is triggered. For this purpose, after release button 50 is pressed down, cam 82 strikes a retaining pawl 84 which releases a firing spring 85 that strikes a piezo block 86. A flash lamp is fired via electrical lines 87 that end in a socket 88 of flash arrangement 16.

Lastly, a leg spring 89, that rests with one leg against body shell 12 and with the other leg, whose end is paddle-shaped, under spring preload against the side wall of lens slide 18 in its non-operating position, is arranged in body shell 12. Configured on lens slide 18 and lying transverse to its movement direction is a shoulder 90 against which leg spring 89 rests with its paddle-shaped end when lens slide 18 is displaced into its taking position, and assists that displacement. In the taking position, leg spring 89 secures the position of lens slide 18.

As mentioned above, the construction and arrangement of film cassette 10 arranged replaceably on body shell 12 will be described below with reference to FIGS. 6–10.

THE FILM CASSETTE STRUCTURE-FIGS. 6–10

According to FIGS. 6–10, film cassette 10 consists of a flat, parallelepipedal housing 20 in which a continuous film channel 21 is provided. Film channel 21 is constituted by two longitudinal sections 21a and 21b extending parallel to one another, as well as semicircular sections 21c and 21d joining their ends.

Parallel to section 21a of film channel 21, housing 20 has an outer wall 22 in which a flat guideway 23 associated with camera-side flat guideway 17 is configured. Parallel to section 21b of film channel 21, housing 20 has an outer wall 45. In addition, an exposure window 24 communicating with film channel section 21a is present in outer wall 22. Provided between film channel section 21a and exposure window 24 is a recess 25 extending over the latter, in which a spring-loaded shutter panel 26 is mounted longitudinally displaceably to close off exposure window 24 when not joined to a camera. A pin 27 that interacts with a camera-side stop in order to open shutter panel 26 is mounted on shutter panel 26. Provided in outer wall 22 of film cassette 10 that faces the camera are two parallel elongated slots 42 which allow a camera-side film gripper 76 to pass through the film perforation of film strip 37 in order to transport it. Pin 27 moves in one of elongated slots 42.

The inner walls of film channel 21 are constituted by a web 28 that, for reasons related to injection molding, is configured as a hollow web. The ends of the web 28 can also be constituted by rotatably mounted rollers having a diameter identical to the thickness of the web.

In order to form a film mouth 44, a wall section 29 of housing 20 is arranged in the region of semicircular film channel section 21d, separated from outer wall 22 and configured as a film hinge by the fact that a constriction 30 is provided in that wall section 29. The free end of wall section 29 is configured as a lip and rests, in light-tight fashion and under elastic preload, against a projection 31 of outer wall 22.

Lastly, web 28 is equipped, opposite exposure window 24, with an opening 32. A film pressure spring 33, which is braced on the one hand by means of a pressure plate 34 against the inside of outer wall 22 and on the other hand by means of spring feet 35 in a socket 36 configured in web 28, projects through this opening 32.

In order to introduce an unexposed packaged film strip 37 of predetermined length through film mouth 44 into film cassette 10, a transfer shoe 38 serving as auxiliary tool is introduced between outer wall 22 and film hinge-like wall section 29, the latter deflecting elastically. Film strip 37 is inserted automatically through this transfer shoe 38 into the film channel of cassette 10 until film strip 37 completely fills film channel 21. A tongue 39 configured concentrically at the beginning of the film strips 37 thus lies in a cutout 40 provided at the end of the film strip (see FIG. 9).

When film cassette 10 is attached onto subminiature camera 11, shutter panel 26 is pulled back by pin 27 so that exposure window 24 is open and film strip 37 is protected from incident light only by shutter blade 60.

In the illustrated embodiment, the film cassette 10 is approximately the size of a credit card. When a picture format of 18×24 mm (half-frame format) is selected, at least eight frames can be accommodated on film strip 37, with the wide side of the frame lying perpendicular to the longitudinal direction of the film strip.

Removal of exposed film strip 37 from film cassette 10 is also accomplished automatically through film mouth 44 by the fact that with transfer shoe 38 inserted between outer wall 22 and elastic film hinge-like wall section 29, film strip 37 is grasped in its perforation by means of a gripper hook 41 and pulled out of film cassette 10.

The individual film strips are then adhesively attached to one another with the tongue 39 of one film strip engaging into the cutout 40 of the preceding film strip with the film strips being adhesively attached at that point. Consequently, the beginning of one film strip is adhesively attached to the end of the preceding film strip.

THE CAMERA OPERATION

Lens slide 18 is initially in its non-operating position, and a film cassette 10 loaded with film strip 37 is attached to body shell 12 via flat guideway 23, as depicted in FIGS. 1 to 3.

In order to take a picture, lens slide 18 is displaced manually into its taking position, as depicted in FIGS. 4 and 5.

In the process, leg spring 89, initially resting against the side surface of lens slide 18, passes under shoulder 90 and, as a result of its spring force, assists lens slide 18 in sliding out. At the same time, snap ball 78 of film gripper 76 snaps into snap recess 79 of lens slide 18, and film gripper 76 is carried along (see FIG. 13), its gripper tooth 81 engaging through elongated slot 42 in film cassette 10 and sliding over the perforation of film strip 37. When the taking position has been reached, film gripper 76 is lifted out of the perforation by a slanted surface 91 configured on film cassette 10 and held in that position by retaining lever 63, as shown by FIG. 18.

At the same time, lens carrier 13 mounted in lens slide 18 is brought into its taking position by passing, against the force of return spring 19, over ramp 39 onto support surface 40.

In this condition the camera is ready to take a picture.

In order to take a photograph, release button 50 is pushed down against the force of return spring 51. This causes release pawl 54 to be pivoted by projection 52 until arm 55 moves away from surface 56 of impact lever 58, and the latter proceeds clockwise as a result of the force of drive spring 57, opens shutter blade 60 against the force of torsion spring 61, and uncovers lens 14 to expose film strip 37.

At the same time, cam 62 of impact lever 58 runs against retaining pawl 84 and pivots it, so that firing spring 85 strikes piezo block 86 and fires a flash lamp.

The pivoting of release pawl 54 also pivots retaining lever 63 via lobe 64, and releases film gripper 76 so that gripper tooth 81 drops into the film perforation (see FIG. 17).

When release button 50 is pushed down, counter bar 67 is moved one tooth, or one digit, by counter lever 65. In this process, pawl-shaped lug 71 of detent pawl 70 moves one tooth farther as the latter pivots. During pivoting, end surface 72 of detent pawl 70 temporarily penetrates into cutout 73 provided on lens slide 18.

In order to prepare for the next picture, lens slide 18 is displaced toward the non-operating position until gripper tooth 81 strikes against stop shoulder 82 in film cassette 10. Film strip 37 is thereby transported one frame interval H. Film gripper 76 remains in snap-locked engagement with lens slide 18. At the same time cam 62 runs against stop 83, and impact lever 58 is rotated once again into its spring-preloaded cocked position in which it is retained by release pawl 54 that is pivoted back. A return element 92 ensures that firing spring 85 is once again held by retaining pawl 84 in the preloaded firing position.

Retaining lever 63 follows along as release pawl 54 pivots back, so that when lens slide 18 is once again in the taking position, gripper tooth 81 of film gripper 76 is lifted away from the film perforation by means of slanted surface 91. If no picture is taken in this position, but instead lens slide 18 is displaced into the non-operating position, film strip 37 is not transported.

If a further picture is taken, the operations again proceed as described.

If no further picture is taken, and the camera is brought into the non-operating position, film gripper 76 is carried along until its gripper tooth 81 contacts stop shoulder 82 and is prevented by it from moving farther. The result of this is that the snap-in connection between snap ball 78 of film gripper 76 and snap recess 79 of lens slide 18 is abolished, and the latter, released from film gripper 76, is moved into its non-operating position. Lens carrier 13 is returned via ramp 39 into its pulled-in position as shown in FIGS. 14 and 15.

When all eight frames of film strip 37 in film cassette 10 have been completely exposed, the latter is removed from body shell 12. In the process, shutter panel 26 is slid by means of pin 27 in front of exposure window 24, and the counter is set to zero. This zero position occurs by the fact that slide 80 disengages counter lever 65 and detent pawl 70 from counter bar 67 by means of hooks 74 and 75, and compression spring 69 pushes counter bar 67 back into its starting position. During this movement, with lens slide 18 in its non-operating position, detent pawl 70 penetrates with its end surface 72 into cutout 93 provided on the lens slide.

If lens slide 18 is not exactly in its taking position, end surface 72 of detent pawl 70 is not located exactly over cutout 73, but rather rests against the end surface of lens slide 18. This makes it impossible to actuate the camera.

What is claimed is:

1. A photographic camera of small, flat design, comprising a body shell provided with a front side and a back side located opposite thereto, a taking lens, a viewfinder, a film chamber, a film transport, and a flash device, wherein the body shell is configured parallelepipedally and has on the front side thereof a flat linear guideway in which a lens slide is guided displaceably from a non-operating position into a taking position; and wherein the film chamber is a film cassette disposed on the back side of the body shell and parallel to the lens slide, for purposes of film transport.

2. The photographic camera as defined in claim 1, wherein the body shell has a linear flat guideway on the back side; and wherein the film chamber is configured as a replaceable film cassette and is displaceably guided in the flat guideway.

3. The photographic camera as defined in claim 1, wherein the lens slide is displaceable from the non-operating position into the taking position and is held in the latter; and wherein in the taking position the viewfinder is uncovered and the lens is in the taking position.

4. A photographic camera of small, flat design, comprising a body shell provided with a front side and a back side located opposite thereto, a taking lens, a viewfinder, a film chamber, a film transport, and a flash device, wherein the body shell is configured parallelepipedally and has on the front side thereof a flat linear guideway in which a lens slide is guided displaceably from a non-operating position into a taking position; and wherein the film chamber is a film cassette disposed on the back side of the body shell and parallel to the lens slide, for purposes of film transport; wherein the lens slide is displaceable from the non-operating position into the taking position and is held in the latter; and wherein in the taking position the viewfinder is uncovered and the lens is in the taking position; and wherein a support surface for the lens carrier in its rest position, which transitions via a ramp configured as an oblique plane into a support surface for the lens carrier in its taking position, is provided in the body shell; and wherein a return spring held on the body shell side engages on the lens carrier and pushes it onto the support surface and the ramp.

5. The photographic camera as defined in claim 3, wherein a lens carrier receiving the lens is guided in the lens slide perpendicular to the movement direction of the lens slide, and is movable from a non-operating position into a taking position and vice versa.

6. The photographic camera as defined in claim 1, wherein a flash arrangement is provided above the lens and the viewfinder on the lens slide.

7. A photographic camera of small, flat design, comprising a body shell provided with a front side and a back side located opposite thereto, a taking lens, a viewfinder, a film chamber, a film transport, and a flash device, wherein the body shell is configured parallelepipedally and has on the front side thereof a flat linear guideway in which a lens slide is guided displaceably from a non-operating position into a taking position; and wherein the film chamber is a film cassette disposed on the back side of the body shell and parallel to the lens slide, for purposes of film transport; wherein a leg spring has one leg braced against the body shell and wherein another leg rests against a side surface of the lens slide under preload and, when the lens slide is moved from the non-operating position into the taking position, engages beneath a shoulder configured thereon and lying transverse to the movement direction of the lens slide, is arranged in the body shell.

8. A photographic camera of small, flat design, comprising a body shell provided with a front side and a back side located opposite thereto, a taking lens, a viewfinder, a film chamber, a film transport, and a flash device, wherein the body shell is configured parallelepipedally and has on the front side thereof a flat linear guideway in which a lens slide is guided displaceably from a non-operating position into a taking position; and wherein the film chamber is a film cassette disposed on the back side of the body shell and parallel to the lens slide, for purposes of film transport; wherein in the body shell, a film gripper is guided longitudinally displaceably in the movement direction of the lens slide and is releasably joined to the lens slide by means of a snap connection.

9. The photographic camera as defined in claim 8, wherein configured on the film gripper is a spring arm on whose free end sits a snap cone or a snap ball that engages into a snap recess configured on the lens slide.

10. The photographic camera as defined in claim 9, wherein the film cassette has a slot; the film gripper passes through the slot in the film cassette; and the slot in the film cassette has a stop shoulder against which the gripper tooth comes to rest after one frame stroke of the lens slide and is thereby immobilized.

11. The photographic camera as defined in claim 10, wherein when the lens slide is moved out one frame stroke into the non-operating position, the snap connection can be released from the lens slide, and can be snapped back into place when the lens slide is moved into its taking position.

12. A photographic camera of small, flat design, comprising a body shell provided with a front side and a back side located opposite thereto, a taking lens, a viewfinder, a film chamber, a film transport, and a flash device, wherein the body shell is configured parallelepipedally and has on the front side thereof a flat linear guideway in which a lens slide is guided displaceably from a non-operating position into a taking position; and wherein the film chamber is a film cassette disposed on the back side of the body shell and parallel to the lens slide, for purposes of film transport; wherein a release button, movable parallel to the lens slide, that engages during the release operation onto a two-armed release pawl, mounted in the lens slide, that rests with one arm on an impact lever for a shutter blade, is provided laterally on the body shell; and wherein a retaining lever, also mounted on the lens slide, rests under spring preload against the impact lever-side arm of the release pawl.

13. The photographic camera as defined in claim 10, wherein the film gripper is held by the retaining lever in a non-operating position, while the lens slide is located in the taking position.

14. The photographic camera as defined in claim 13, wherein when the impact lever is released, the retaining lever is pivotable by means of the release pawl out of the region of the film gripper.

15. The photographic camera as defined in claim 14, wherein a counter lever extending approximately parallel to the lens slide, movable longitudinally with the release button, and pivotable transversely to that direction, which engages with a pawl configured at its free end into the teeth of a counter bar, is arranged on the release button.

16. The photographic camera as defined in claim 15, wherein a detent pawl, which engages by means of a pawl-shaped lug into the teeth of the counter bar and which lies with an end surface at a short distance opposite a side surface of the lens slide, is pivotedly mounted in the body shell.

17. The photographic camera as defined in claim 16, wherein the lens slide has, in the side wall, cutouts which are located opposite the detent pawl when the lens slide is in the taking position and the non-operating position, respectively.

18. The photographic camera as defined in claim 17, wherein the film cassette is changeable and a gate is provided on the film cassette, which holds the counter lever and the detent pawl out of engagement with the counter bar, when the film cassette is changed.

19. The photographic camera as defined in claim 12, wherein the impact lever has an impact arm for the shutter blade and a cam for a retaining pawl, holding a firing spring, with which a piezo block for the flash device is associated.

20. The photographic camera as defined in claim 19, wherein a stop which, when the lens slide is displaced for the purpose of film transport, engages on the cam in such a way that the impact lever returns to a starting position in which the release pawl is resting is provided in the body shell.

* * * * *